G. W. GARDNER.
ELECTRODE HOLDER.
APPLICATION FILED MAR. 29, 1918.
1,284,306.
Patented Nov. 12, 1918.
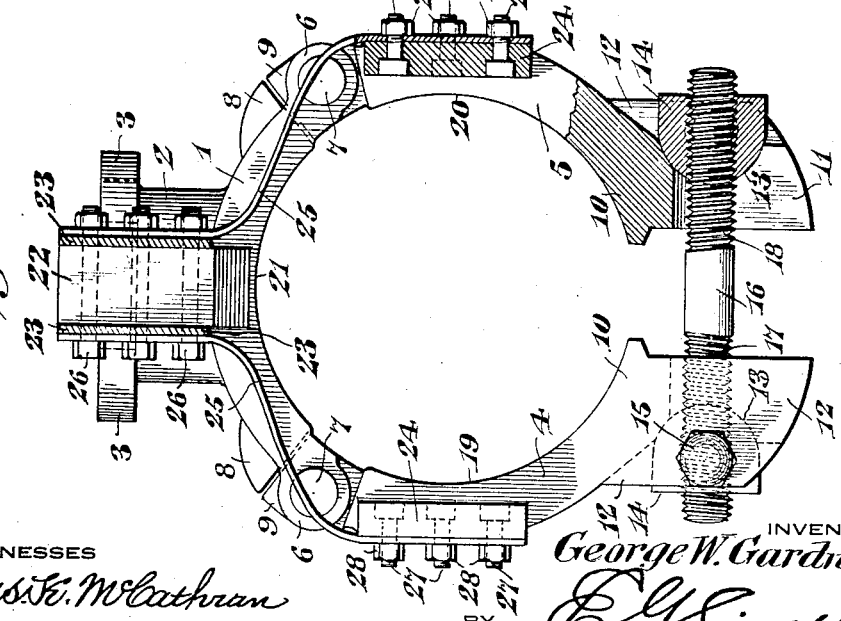
WITNESSES
INVENTOR
George W. Gardner,
BY
ATTORNEY

UNITED STATES PATENT OFFICE.

GEORGE WILLIAM GARDNER, OF LEBANON, PENNSYLVANIA, ASSIGNOR OF ONE-HALF TO JOHN R. UMBERGER, OF LEBANON, PENNSYLVANIA.

ELECTRODE-HOLDER.

1,284,306. Specification of Letters Patent. Patented Nov. 12, 1918.

Application filed March 29, 1918. Serial No. 225,495.

*To all whom it may concern:*

Be it known that I, GEORGE WILLIAM GARDNER, a citizen of the United States, residing at Lebanon, in the county of Lebanon and State of Pennsylvania, have invented a new and useful Electrode-Holder, of which the following is a specification.

This invention has reference to electrode holders, and its object is to provide an electrode holder for heavy duty, whereby the electrode and holder are alined evenly and make good contact, and which may be readily opened to slip the electrode through the holder. Moreover, the electrode holder admits of a construction wherein steel may replace more expensive metals, with the added advantage that it is more hardy than the metals heretofore used, and its deterioration rate is far less rapid, while the necessity of using cooling water is avoided.

The invention comprises a three-part holder, of which two opposed members form jaws hinged to the third member, and firmly grip the electrode whether of circular or other shape, used for the purpose, the jaws having means at the ends remote from their hinges to permit the drawing together or separating of the jaws as desired.

It has heretofore been considered obligatory to make the electrode holders of copper or similar material of high electrical conductivity, but such material rapidly deteriorates in use, and moreover, is highly expensive. I have found from actual practice that steel may be substituted for copper, with the advantage of added strength, greater resistance to deterioration under the conditions of use, and with the avoidance of water cooling, despite the insistence of constructing engineers who have heretofore installed electric furnaces for which the electrode holder of the invention is particularly intended, although it may have other uses than the special one mentioned.

The invention will be best understood from a consideration of the following detailed description, taken in connection with the accompanying drawing forming part of this specification, with the further understanding that, while the drawing shows a practical form of the invention, the latter is not confined to any strict conformity with the showing of the drawings but may be changed and modified, so long as such changes and modifications come within the scope of the appended claims.

In the drawing:—

Figure 1 is an end elevation, partly in section, of an electrode holder embodying the invention, the electrode being omitted;

Fig. 2 is a side elevation, partly in section, of the electrode holder of Fig. 1, but omitting the electrode.

Referring to the drawing, there is shown a body member 1 having a central neck portion 2 with a terminal flange 3, by which latter the electrode holder is made fast to some fixed part of the furnace or other structure to which the electrode holder is applied. The body member 1 is shown as of partially cylindrical shape, and hinged to the opposite ends of the body member 1 are jaws 4 and 5 respectively, each of partially cylindrical shape and sufficiently extensive circumferentially to constitute with the body member 1 a nearly complete cylinder. The body member 1 and jaws 4 and 5 have interspersed ears 6 in alternate intermesh, and pivoted together by hinge pintles 7 so that the jaws may swing toward and from each other. Opposed lugs 8 and 9 on the body member 1 and jaws 4 and 5 respectively, serve as limiting means for the opening movement of the jaws.

Each jaw is formed at the end remote from its hinge connection to the body member with a projecting portion 10 having at its outer end a centrally located entering slot 11. At the sides of each extension 10 are flanges 12, and across each extension 10 is a recess 13. Adapted to each recess 13 is a block 14 of partially cylindrical shape where seated in the recess 13, the latter being also of partially cylindrical or concave conformation, so that the block 14 may rock in the recess 13 as a seat. Each block 14 is entered from opposite ends by screws 15 each extending through a respective flange 12, the screws acting as journals for the blocks 14. Traversing each block 14 at its mid portion is a screw rod 16 having threaded ends 17 and 18 respectively, which are portions of the rod 16 traversing the blocks 14. The screw threaded ends 17 and 18 are right and left handed screws, so that on turning the rod 16 in one direction, the blocks 14 are drawn toward each other, and on turning the rod in the other direction, they are moved away from each other. The jaws 4 and 5 have gripping faces 19 and 20 respectively, and the body member 1 has a gripping face 21, these gripping faces defining substantially a cylinder when in position to grip or clamp an electrode, which latter may be circular or some other suitable shape in cross section.

Extending from the body member 1 and its neck 2 is a lug 22 to opposite sides of which are secured bus-bars 23. Extending from the jaws 4 and 5 lengthwise of the electrode holder are other lugs 24, corresponding to the lug 22, to which the lugs 24 are each joined by a short bus-bar 25 which may be in the form of a flat band of suitable gage and length. Bolts 26 traverse the bus-bars 25, the lugs 22 and the short bus-bars 23, and fasten them all together. Other bolts 27 have their heads seated in the lugs 24 at the face thereof remote from the bus-bars 25 and extend through the lugs and through the respective bus-bars 25. The bolts have nuts 28 applied to them to hold the bus-bars to the respective lugs.

The jaws 4 and 5 and the body member 1 may be made of a ferrous metal such as steel or cast iron, while the bus-bars 25 may be made of copper strips of suitable length and thickness to bridge the hinges between the body member and jaws, and to carry the current employed without undue heating. The small movement of the jaws on opening and closing is readily taken care of by the bus-bars 25 without putting the latter to bending strains sufficient to cause breaking.

The electrode holder is designed as a heavy duty holder carrying heavy electric currents for electric furnace or similar work, and such electrode holders are subjected to relatively high temperatures. The electrodes are customarily made of carbon, and the electrode holder of this invention is designed to be used in conjunction with carbon electrodes. The heat to which the electrode holder is subjected and the effect of the current in passing from the electrode holder to the electrode, or the reverse, has the effect, unless water cooling be resorted to, of quickly deteriorating copper electrode holders, which are the kind customarily used. Even with water-cooled electrode holders, the opening and closing of the jaws to slip the electrodes soon causes crystallization of the solid copper jaws generally used and the frequent breaking of such jaws.

The hinge connections between the jaws and the body member permit the holder to evenly grip the electrode and always make good contact therewith, and also permit the holder to be opened to a small degree sufficient to allow slipping of the electrode when new adjustments thereof are desired.

Experience has shown that the holder may be made of ferrous metal, such as steel or iron and this material has the advantage of not requiring water cooling to prevent the attainment of temperature which would be destructive to copper, or other similar metals without water-cooling. The current may be carried by copper bus-bars past or around the hinges to the jaws 4 and 5 for direct distribution to the electrode, and in either case will reach the electrode directly from the bus-bars without the necessity of traversing the hinges, which latter, because of their construction, would necessarily offer considerable resistance to the passage of current to the jaws, with consequent heating of the hinges and of the body portion 1 of the electrode holder. Under the action of the current and its heating effect upon the holder and jaws, electrode holders as heretofore constructed have been found to rapidly deteriorate. As such electrode holders are customarily of copper or some similar material of high cost as compared with iron or steel, the upkeep of the holders represents a very material expense. The lugs 22 and 24 are cast integral with the body of the holder and the hinge members 4 and 5, respectively, and serve to space the bus-bars 25 away from the hinged parts of the holder, thus keeping the contacts cooler than heretofore, and thereby adding to the efficiency of the holder.

It will be understood that more than two hinges may be used. The main bus-bars may be carried directly to the jaws instead of branching off short bus-bars around the hinges. Furthermore the arrangement has the advantage of a much better distribution of current to the electrode than has heretofore been accomplished.

What is claimed is:—

1. An electrode holder for heavy duty comprising a body member and opposed jaw members hinged together, the body member and jaw members having lugs thereon extending away from the respective members in the same direction as the longitudinal axis of the holder, and bus-bars connecting the lugs to bridge the hinge connections between the jaws and the body member.

2. An electrode holder for heavy duty comprising a body member and opposed jaw members hinged together, the body member and jaw members having lugs thereon extending away from the respective members in the same direction as the longitudinal axis of the holder, and bus-bars connecting the lugs to bridge the hinge connections between the jaws and the body member, the body member and jaws, together with the lugs carried thereby being formed of ferrous metal, and the bus-bars being formed of material of superior electric conductivity to the ferrous metal and of a flexibility to permit the opening and closing of the jaws without strain upon the bus-bars.

3. An electrode holder comprising a body portion of a form to partially embrace the electrode, jaws hinged to opposite sides of the body portion, and together with the body portion extending about the major part of the electrode, the body portion and jaws having lugs thereon extending from the respective parts of the holder in the same direction as the longitudinal axis of the holder, and bus-bars connected to the lugs and constituting electrical bridging means for the hinges spaced away from the holder by the lugs.

4. An electrode holder for heavy duty comprising a body member of partially cylindrical form with a neck for sustaining it, jaw members also of partially cylindrical form each hinged at one end to the body member, means for connecting and adjusting the other ends of the jaws to clamp or loosen an electrode in the holder, said body member with the neck having lugs projecting therefrom, and each jaw having a lug projecting therefrom, with the direction of projection of the lugs from the body member and from the jaws corresponding to the direction of projection of the longitudinal axis of the holder, and flexible bus-bars connecting the lugs of the body member with respective lugs of the jaws across and spaced from the hinge connections, whereby current fed to the lugs on the body member will pass by the bus-bars to the lugs on the jaws without the necessity of traversing the hinge connections.

5. An electrode holder for heavy duty comprising a body member defining a fractional portion of the holder and provided with a neck for sustaining it, said body member and neck having a lug projecting from one end thereof and provided with means for securing bus-bars to it, jaws hinged to the body member and constituting the remaining portions of the holder, each jaw having a lug projecting therefrom in the same direction as the lug on the body member, means at the ends of the jaws remote from the hinges for moving the jaws into clamping relation to an electrode mounted therebetween, and flexible bus-bars each connected at one end to a bus-bar on the body member and at the other end to a lug on the jaw, the lugs being located to cause the flexible bus-bars to bridge respective hinges between the jaws and body member, and said lugs spacing the flexible bus-bars from the electrode clamping portion of the holder.

In testimony that I claim the foregoing as my own, I have hereto affixed my signature in the presence of two witnesses.

GEORGE WILLIAM GARDNER.

Witnesses:
 EUGENE HOASTER,
 JOHN R. UMBERGER.